(12) United States Patent
Gorday et al.

(10) Patent No.: US 8,779,901 B2
(45) Date of Patent: Jul. 15, 2014

(54) ASYMMETRIC RTT RANGING WITH MULTIPATH CORRECTION

(75) Inventors: Paul E. Gorday, West Palm Beach, FL (US); Edgar H. Callaway, Jr., Boca Raton, FL (US); Frederick L. Martin, Plantation, FL (US)

(73) Assignee: Sunrise Micro Devices, Inc., Deerfield Beach, FL (US)

( * ) Notice: Subject to any disclaimer, the term of this patent is extended or adjusted under 35 U.S.C. 154(b) by 545 days.

(21) Appl. No.: 13/084,865

(22) Filed: Apr. 12, 2011

(65) Prior Publication Data

US 2011/0250844 A1    Oct. 13, 2011

Related U.S. Application Data

(60) Provisional application No. 61/323,505, filed on Apr. 13, 2010.

(51) Int. Cl.
*H04Q 5/22* (2006.01)
*H04B 17/00* (2006.01)

(52) U.S. Cl.
CPC .................................. *H04B 17/0047* (2013.01)
USPC ................ 340/10.41; 340/572.1; 340/539.13; 342/47; 342/118; 702/158; 370/329

(58) Field of Classification Search
USPC ......... 340/10.41, 539.13, 572.1; 342/47, 118; 702/158; 455/562.1; 370/329
See application file for complete search history.

(56) References Cited

U.S. PATENT DOCUMENTS

| | | | | |
|---|---|---|---|---|
| 4,799,062 | A  * | 1/1989 | Sanderford et al. | 342/450 |
| 7,710,239 | B2 * | 5/2010 | Kranz | 340/10.1 |
| 7,872,583 | B1 * | 1/2011 | Yushkov et al. | 340/572.1 |
| 2007/0139200 | A1 * | 6/2007 | Yushkov et al. | 340/572.1 |
| 2008/0102897 | A1 * | 5/2008 | Song et al. | 455/562.1 |
| 2008/0186136 | A1 * | 8/2008 | Raphaeli et al. | 340/10.1 |
| 2008/0307025 | A1 * | 12/2008 | Licul | 708/308 |
| 2008/0308025 | A1 * | 12/2008 | Cresswell et al. | 111/188 |
| 2009/0201169 | A1 * | 8/2009 | d'Hont et al. | 340/825.49 |
| 2009/0213806 | A1 * | 8/2009 | Ode | 370/329 |

* cited by examiner

*Primary Examiner* — George Bugg
*Assistant Examiner* — Naomi Small

(57) ABSTRACT

A method, system, and device provide asymmetric round-trip-time (RTT) ranging with multipath correction. A RTT ranging determination using the resulting composite received signal contains multipath error, and compensation or correction of this error in a manner compatible with low-power, low-complexity devices, such as tag devices, is provided.

29 Claims, 17 Drawing Sheets

ROUND-TRIP-TIME SIGNAL DIAGRAM

ROUND-TRIP-TIME SIGNAL DIAGRAM

INTERROGATOR/TAG BLOCK DIAGRAM

ASYMMETRIC RTT RANGING WITH MULTIPATH CORRECTION

PRIORITY CLAIM

This application claims priority to U.S. Provisional Patent Application No. 61/323,505 filed Apr. 13, 2010, which is hereby incorporated herein by reference.

BACKGROUND

The field of the invention relates to a wireless round-trip-time (RTT) ranging operation between a relatively high-power, high-complexity interrogator device and a relatively low-power, low-complexity tag device. As illustrated in FIG. 1, the interrogator initiates the RTT ranging operation by sending a first wireless signal to the tag device. After receiving the first wireless signal, the tag device waits a predetermined amount of time and then sends a second wireless signal back to the interrogator device. The total round-trip-time is measured in the interrogator device between specific events (e.g., trailing edge) of the transmitted first wireless signal and received second wireless signal.

Since the duration of the turnaround time (TAT) and second wireless signal (T2) are known, the propagation time can be determined from the measured RTT:

$$\tau = \frac{RTT - TAT - T2}{2} \quad (1)$$

Range is proportional to propagation time, R=τc, where c is the speed of the wireless signals.

There may be other minor fixed delays associated with signal reception and processing, but these can be quantified and removed as well. The block diagram of FIG. 2 illustrates the basic components that comprise an interrogator device or a tag device. As previously mentioned, specific block characteristics such as processor complexity, clock speeds, transmit power, etc., are selected appropriately for a high-power interrogator and a low-power tag. A processor, which may be referred to as a controller, provides data waveforms "Dtx" to the modulator and receives data waveforms "Drx" from the demodulator. The processor also provides control information "Cntrl" to the Timer used to measure round-trip-time for ranging. Timer measurement data "Dtmr" is retrieved by the Processor. A frequency generator block produces various clock and oscillator signals used by the Processor, Timer, and Transceiver. A modulated signal "Stx" is converted to a wireless signal which is transmitted from the device, and a received wireless signal is converted to modulated signal "Srx" for further processing by the demodulator. In addition to recovering any information present in the received signal, the Processor may also include other functions used to determine arrival time of the received signal.

Multipath Issues

One of the issues with implementing a wireless RTT ranging system is multipath propagation, in which radio waves travel by different paths and reach the receiver with small time offsets. As can be seen in FIG. 3, in a simplified system block diagram, a tag device and an interrogator device may be in communication via communication link having multiple paths P1, P2 and P3. While the range on the direct path P1 is usually desired in most applications, delayed copies of the transmitted signal may also reach the tag via alternative paths P2 and P3. A RTT ranging determination using the resulting composite received signal therefore contains multipath error, which must be removed to produce the correct ranging value along the direct path P1. A means of compensating or correcting for this error, compatible with a low-power, low-complexity device such as a tag, would therefore be useful.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
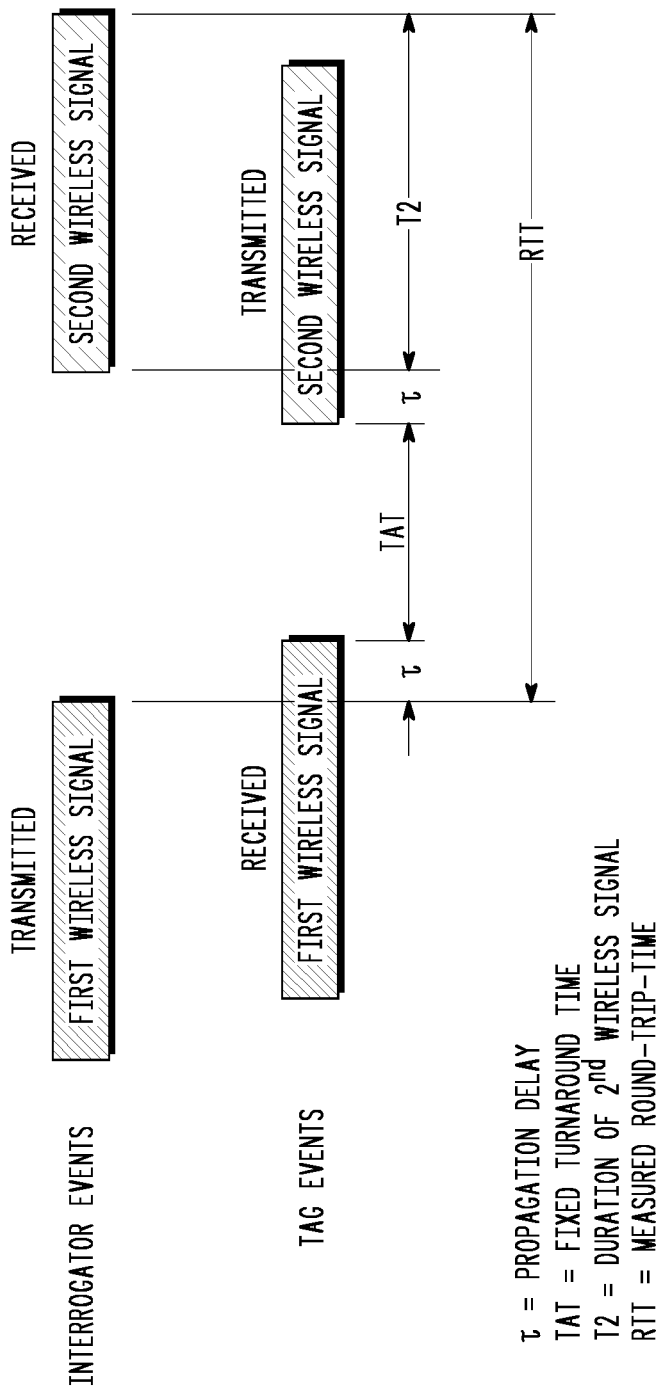
FIG. 1 is a round-trip-time signal diagram.

The various methods, systems, and devices described herein provide asymmetric RTT ranging capabilities. While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

For narrowband signals, the transmitted symbol time is significantly greater than the multipath time offsets, and it is not usually possible to resolve individual signal arrival times for each path. The arrival time of the composite received signal will therefore be a composite arrival time that depends on the relative strengths and arrival times of each of the individual signal paths. However, the desired path for ranging purposes is the direct path (P1), and measuring a "composite arrival time" introduces error into the overall RTT ranging result. The composite arrival time may be, for example, an average or otherwise weighted value.

For very wideband signals, the transmitted symbol time is less than the multipath time offsets, and with proper signal coding it is possible to resolve individual signal paths. As long as the direct path has sufficient signal strength, correct time of arrival can be determined, thereby avoiding or minimizing multipath error in the RTT ranging result.

The ratio of the bandwidth of the wideband to narrowband signals is understood to be approximately four or more.

Clearly the use of very wideband signals is desirable in RTT ranging systems in order to minimize multipath error; however, use of such signal schemes is costly in terms of device complexity and power consumption.

Figure 4:
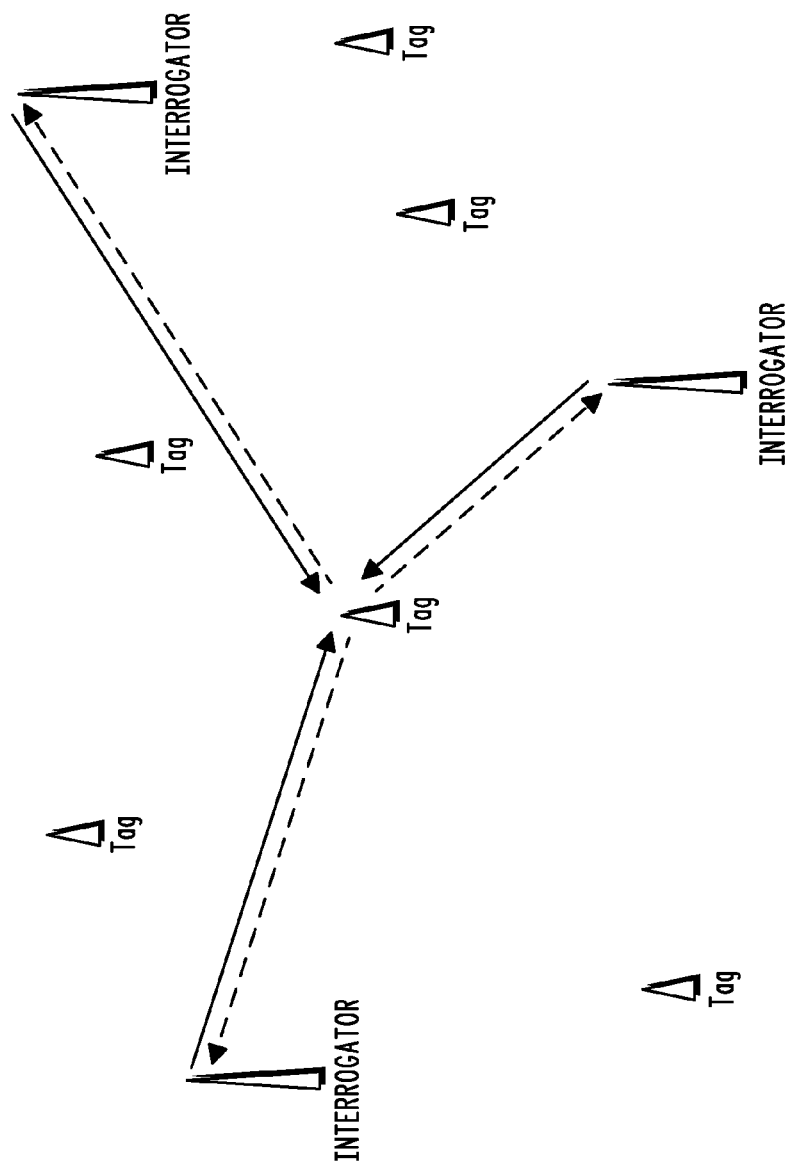
FIG. 4 is a block diagram of a wireless communication system having a plurality of tag and interrogator devices, in accordance with various representative embodiments.

Referring now to FIG. 4, a ranging system block diagram illustrates that multiple interrogators may perform the ranging operation with one or more tag devices. Thus each tag device may be in communication with one or more interrogator devices as shown. The computed range values, along with the known interrogator locations, allow the position of the tag devices to be estimated using known techniques such as trilateration. The interrogators may exchange information and ranging results with each other or with other system devices via wired or wireless communications to facilitate the position calculations.

Asymmetric RTT Ranging

When the interrogator device and tag device have significantly different power and complexity capabilities, as assumed here, an asymmetric RTT ranging system is needed to meet overall system goals. The interrogator's wireless signal is a narrowband signal such that the need for complex, high-speed signal processing in the tag device is minimized. The tag's wireless signal is a very wideband signal, which is relatively simple to generate in the tag device and provides good arrival time accuracy with minimum transmit power.

The narrowband wireless signal will only permit "composite arrival time" detection in the tag device, and the tag will therefore introduce multipath error in the overall RTT measurement. However, with additional signal processing, the interrogator device can estimate the multipath error introduced by the tag and compensate for it. It is generally accepted that the interrogator and tag wireless signals will experience the same multipath propagation if each device uses the same or similar antenna structure, in substantially the same physical location, for both transmit and receive functions. This is known as channel reciprocity. Because the wideband wireless signal allows resolution of individual signal paths, the interrogator is able to detect the direct path as well as estimate the composite arrival time by proper combining of the amplitude and phase information of all individual paths. With knowledge of both the direct path arrival time and the composite arrival time, the interrogator can compensate for the multipath error introduced by the tag device. Compensation may simply comprise subtracting the difference in time between direct path arrival time and composite arrival time from the RTT measurement. Alternately, compensation may comprise subtracting a more general function of the first and composite arrival times, such as a scaled difference, or the difference plus an offset, such that the time measurement is compensated at least in part by the difference in time between the direct path arrival time and the composite arrival time from the RTT measurement.

Composite Arrival Time

A number of methods are available for combining the individual path gain and phase information in order to estimate the composite arrival time. If both gain and phase information are available for each path, then the channel can be viewed as a filter, and the group delay of the channel can be readily computed. Other options include computing the pulse response of the filter and determining the arrival time of the output peak or leading edge.

Approximations to the group delay or pulse delay can be obtained if only the gain information is available for each path. In particular, the amplitude (or power) of each path versus arrival time can be viewed as a probability density function. With this view, the composite arrival time can be approximated using operations such as mean and median. Another example is to approximate the composite arrival time as the arrival time associated with the strongest path.

Variations

Figure 9:
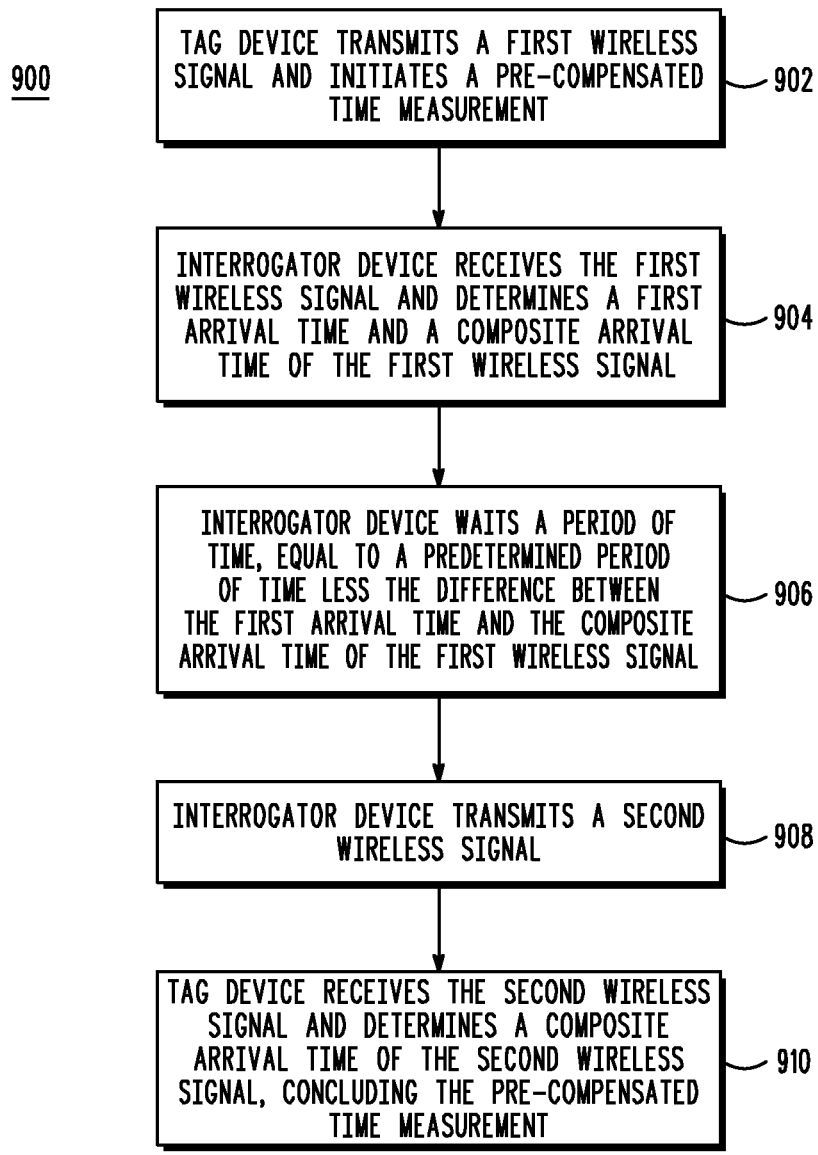

Note that the tag device can also initiate the ranging procedure and be responsible for the overall RTT measurement and subsequent range calculation. In this case, the interrogator device can pre-compensate for the composite arrival time measurement of the tag by shortening its TAT period by an amount equal to the difference in time between the first arriving signal and the composite arrival time that it computes from all detected paths. This is shown and described further in connection with FIG. 9 of the drawings. Alternatively, the interrogator can use a fixed TAT period and send the compensation value to the tag so that the tag device can correct its range calculation. This is illustrated and described further in connection with FIG. 10 of the drawings. Finally, in cases where the tag sends its range calculation back to the interrogator, the interrogator can use a fixed TAT period and then compensate the range result received from the tag. This is shown and described further in connection with FIG. 11 of the drawings.

An Exemplary Embodiment

In accordance with an exemplary embodiment, the first and second wireless signals share a common frequency channel using time division duplexing (TDD) techniques. The frequency channel may belong to a set of channels in the ultra-high frequency (UHF) band allocated for long-distance ranging and communication applications.

Figure 5:
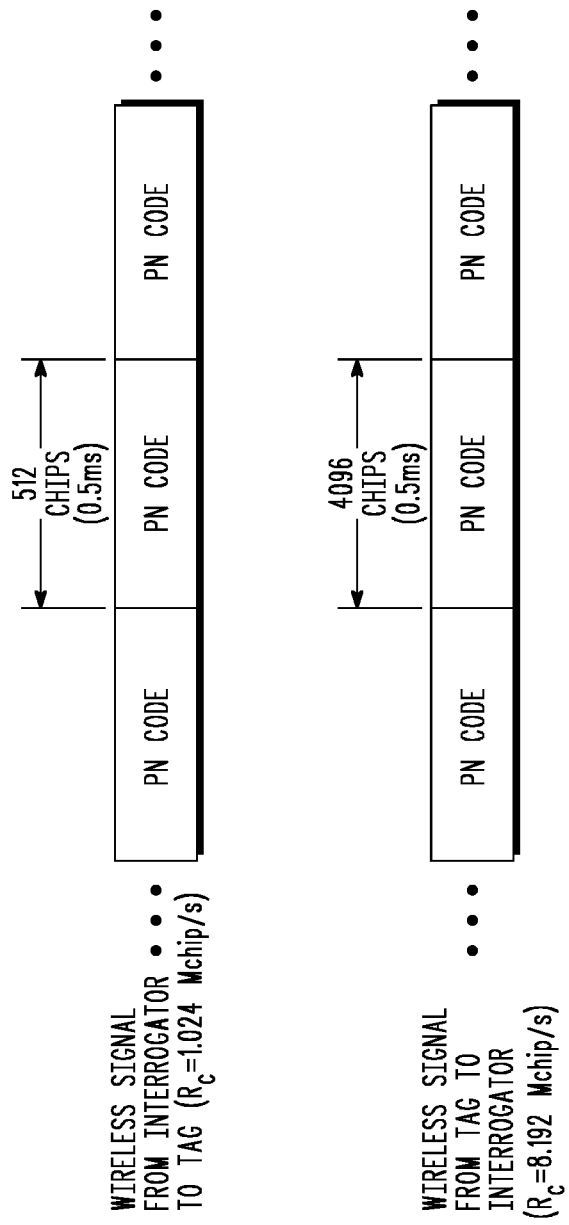
FIG. 5 illustrates wireless signal formats for interrogator and tag devices, in accordance with various representative embodiments.

A typical modulation technique is direct-sequence spread spectrum (DSSS), which supports high-resolution time-of-arrival estimation as well as robust communications in the presences of other system users or interference. The wireless signals may consist of one or more repetitions of a pseudo-noise (PN) spreading code as shown in FIG. 5. The PN codes may be further modulated with data without compromising the ranging capability of the system.

To match the asymmetric processing capabilities of each device, the number of chips in the PN code, as well as the rate $R_c$ at which chips are transmitted, are different for the first and second wireless signals. Practical values for the two cases are shown in FIG. 5. A common code repetition period simplifies protocol timing, and its particular value (0.5 ms, in this example) determines the maximum detectable range between devices.

Figure 6:
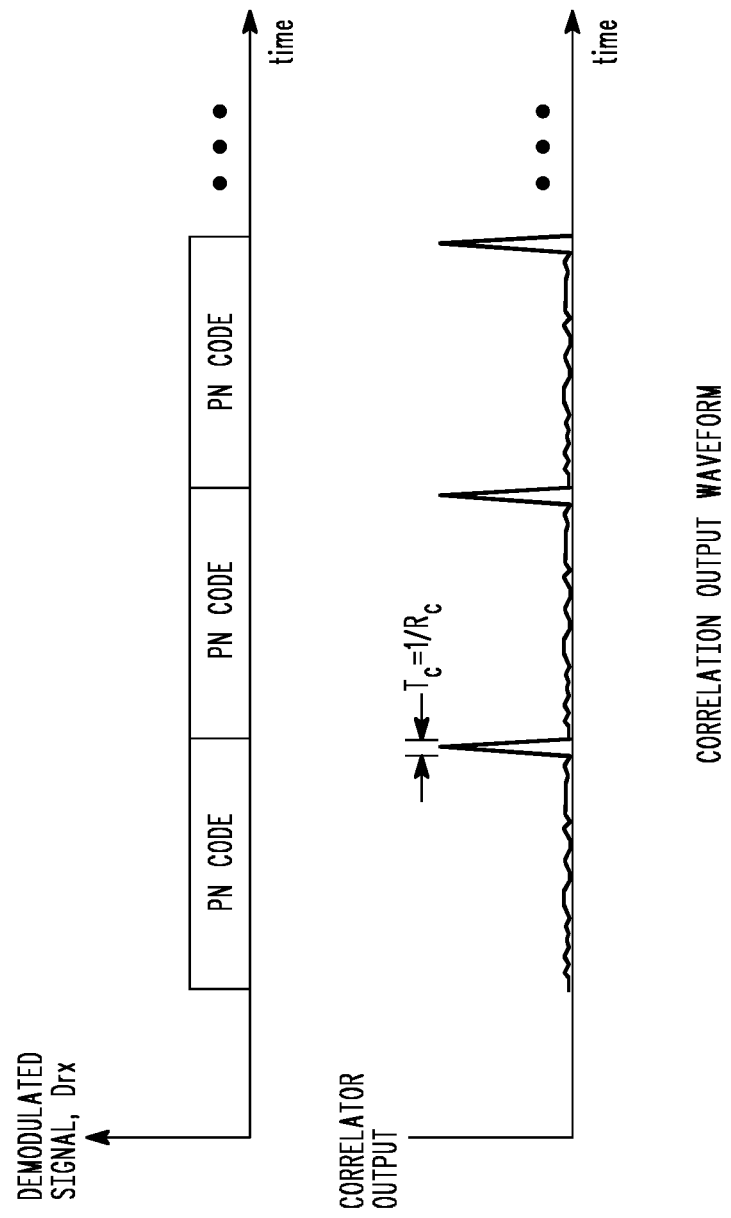
FIG. 6 illustrates a correlation output waveform, in accordance with various representative embodiments.

After demodulation of the wireless signal in the receiver, the recovered chip sequence is correlated with a local copy of the PN code. When the local PN code and the recovered code perfectly overlap, the correlator produces a well-defined peak whose duration is approximately equal to one chip period (FIG. 6). The epoch associated with the first correlation peak is used to determine the time-of-arrival of the wireless signal. Signal processing delays in the receiver can be characterized in advance so that arrival time of the signal can be accurately measured.

Figure 7:
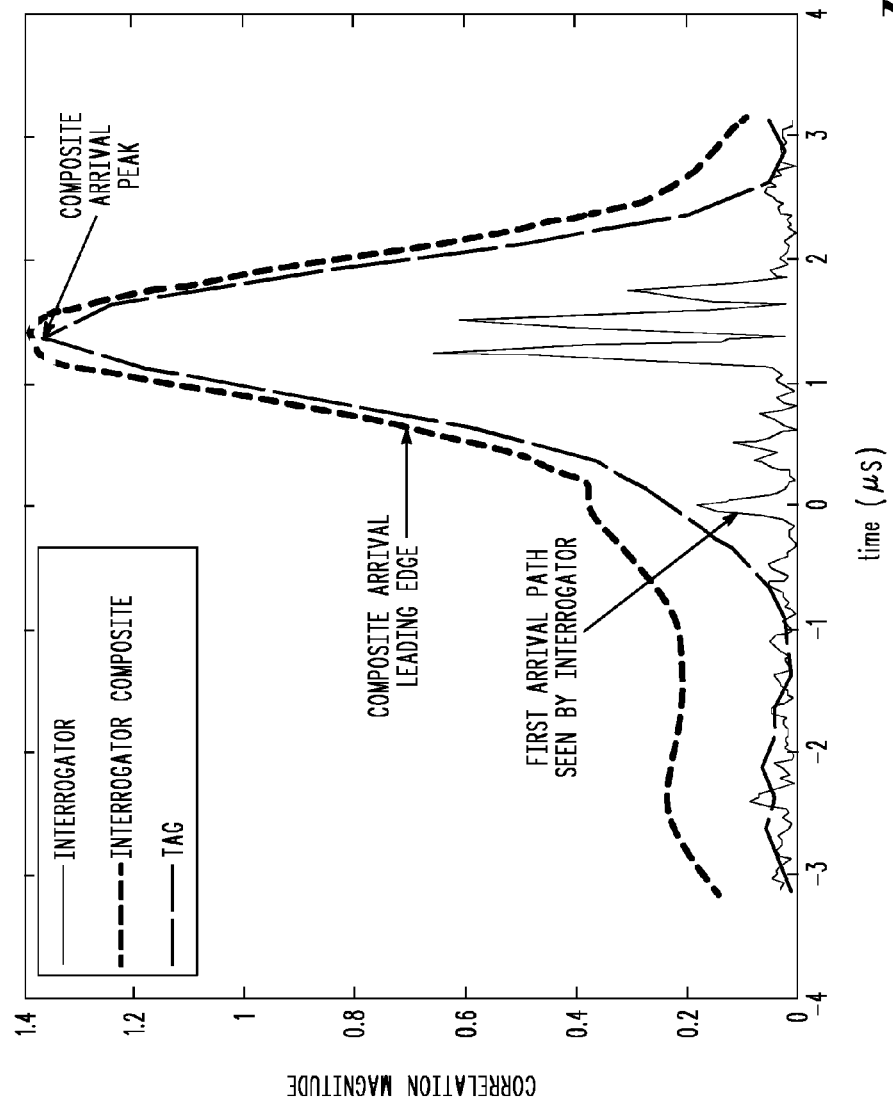
FIG. 7 illustrates correlation results for interrogator and tag devices, in accordance with various representative embodiments.
Figure 8:
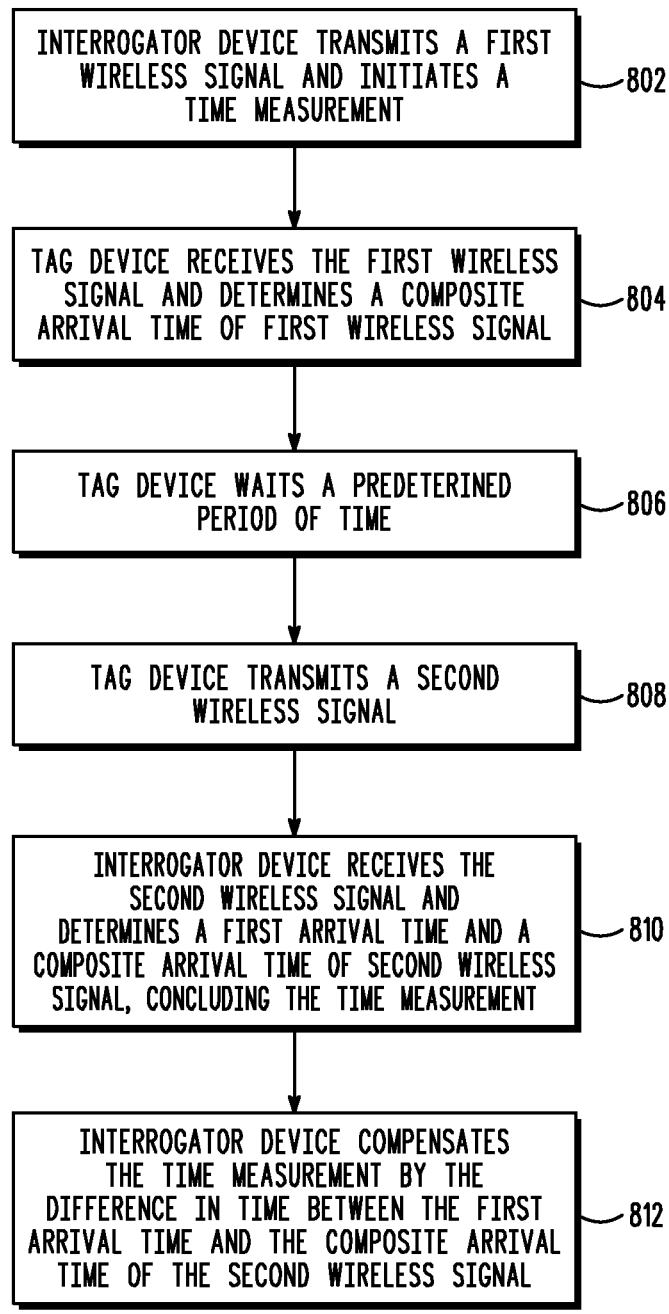
FIGS. 8-11 are flowcharts that illustrate various approaches to asymmetric RTT ranging, in accordance with various representative embodiments.

Resolution of the time-of-arrival measurement is typically a fraction of the chip period. This is an important metric in wireless channels where multipath propagation results in multiple copies of the wireless signal arriving at the receiver at slightly different times. To avoid errors in the subsequent range calculation, it is therefore important to identify the earliest multipath signal copy. FIG. 7 illustrates the difference in time-of-arrival resolution for the interrogator correlation (8.192 Mchips/s) and the tag correlation (1.024 Mchips/s) for the same multipath channel.

Arrival time is typically identified using: (1) the half-power point on the leading edge of the correlation peak, or (2) the maximum value of the correlation peak. For the tag device, each of these results would introduce significant error with respect to the arrival time of the first path. The tag effectively measures the average, or composite, arrival time for the group of multipath signals.

Because of the improved resolution afforded by the higher chip rate, the interrogator can measure the first arriving path more accurately. The interrogator can also measure the later multipath arrival times and create an estimate of the composite arrival time. Several options for this estimate are possible, but a straightforward approach is to convolve (i.e., filter) the interrogator correlation result with a pulse that has similar shape to the ideal correlation peak of the tag.

The difference between the interrogator's high-resolution measurement and estimated composite can be used to compensate the overall range calculation using one of the methods described above.

In light of the foregoing, and referring now to the flowcharts of FIGS. 8-11 of the drawings, the various approaches to asymmetric RTT ranging will be further discussed. In flow 800 of FIG. 8, a methodology of asymmetric RTT ranging in accordance with various embodiments in which the interrogator device can initiate a time measurement and be responsible for the overall RTT measurement and subsequent range calculation is disclosed. At Block 802, the interrogator device transmits a first wireless signal and initiates a time measurement. At Blocks 804-808, a tag device receives the first wireless signal and determines a composite arrival time of the first wireless signal and then transmits the second wireless signal after a predetermined period of time. At Block 810, the interrogator device receives the second wireless signal and determines the first arrival time and the composite arrival time of the second wireless signal, concluding the time measurement. At Block 812, the interrogator device compensates the time measurement by the difference in time between the first arrival time and the composite arrival time of the second wireless signal. A bandwidth of the first wireless signal and a bandwidth of the second wireless signal differ by a factor of approximately four or more.

From the perspective of action undertaken over by the interrogator device, the asymmetric RTT ranging method may be thought to comprise: the interrogator device: transmitting a first wireless signal and initiating a time measurement; receiving a second wireless signal and determining a first arrival time and a composite arrival time of the second wireless signal, concluding the time measurement; and compensating the time measurement by the difference in time between the first arrival time and the composite arrival time of the second wireless signal. The bandwidths of the first and second wireless signals differ by a factor of approximately four or more.

Figure 2:
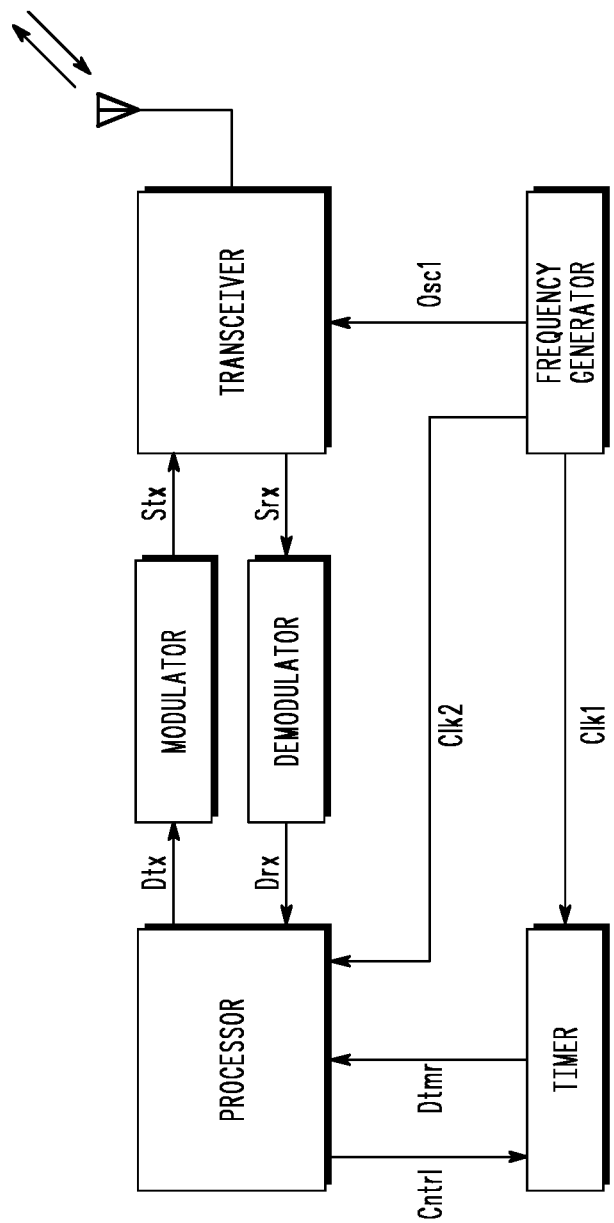
FIG. 2 is a block diagram of a tag device or an interrogator device, in accordance with various representative embodiments.

Referring back to the block diagram of FIG. 2, such an interrogator device is understood to have a processor or controller; a transceiver coupled to the processor; and a timer coupled to the processor. The transceiver may further have a modulator coupled to the processor and a demodulator coupled to the processor as indicated. When so controlled by the processor, the transceiver transmits a first wireless signal and the timer initiates a time measurement; the transceiver receives a second wireless signal and provides it to the processor; the processor determines a first arrival time and a composite arrival time of the second wireless signal and controls the timer to conclude the time measurement by the timer; and the processor compensates the time measurement according to the difference in time between the determined first arrival time and the determined composite arrival time of the second wireless signal. The bandwidths of the first and second wireless signals differ by a factor of approximately four or more.

As previously described, the tag device can also initiate the ranging procedure and be responsible for the overall RTT measurement and subsequent range calculation. Referring to flow 900 of FIG. 9, the interrogator device can pre-compensate for the composite arrival time measurement of the tag by shortening its TAT period by an amount equal to the difference in time between the first arriving signal and the composite arrival time that it computes from all detected paths, in accordance with various embodiments. In an asymmetric RTT ranging method at Block 902, a tag device transmits a first wireless signal and initiates a pre-compensated time measurement. At Block 904, an interrogator device receives the first wireless signal and determines a first arrival time and a composite arrival time of the first wireless signal. The interrogator device waits a predetermined period of time less the difference in time between the first arrival time and the composite arrival time of the first wireless signal at Block 906, and at Block 908 transmits a second wireless signal. At Block 910, the tag device receives the second wireless signal and determines the composite arrival time of the second wireless signal, concluding the pre-compensated time measurement. The bandwidths of the first and second wireless signals differ by a factor of approximately four or more.

Figure 3:
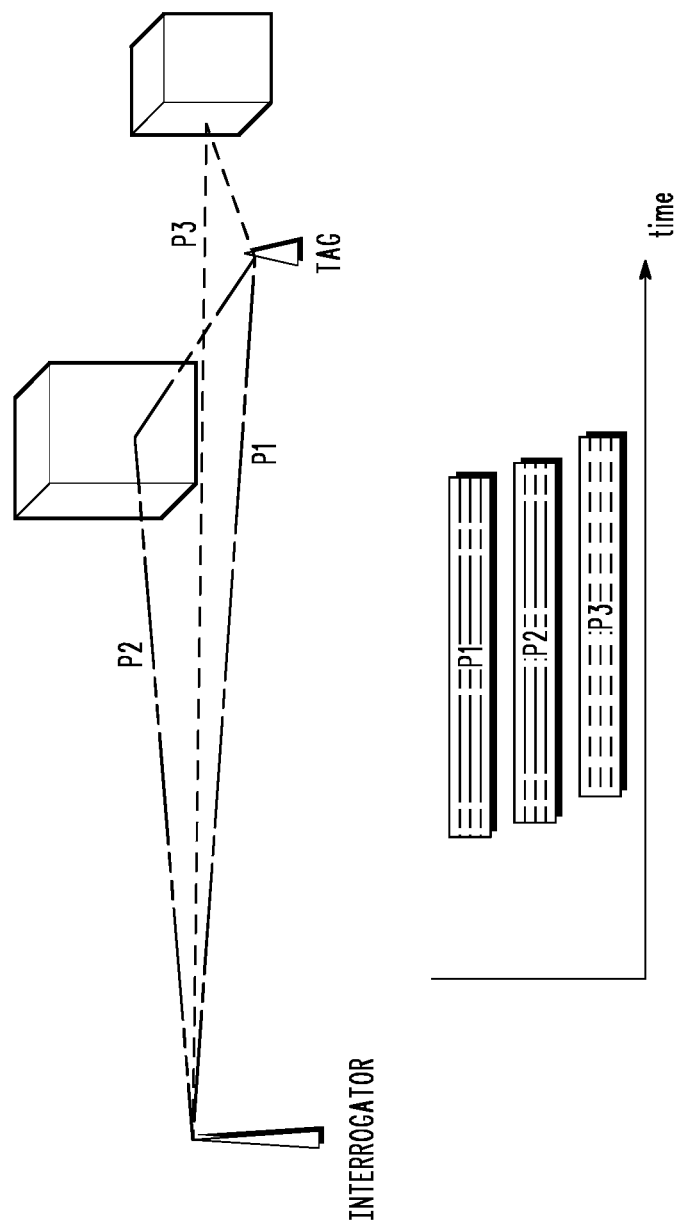
FIG. 3 illustrates multipath propagation.

A wireless round-trip-time (RTT) ranging system as shown in FIG. 3 or 4, then, may comprise at least an interrogator device, as shown in FIG. 2, with an interrogator processor; an interrogator transceiver coupled to the interrogator processor; and an interrogator timer coupled to the interrogator processor; and a tag device, as shown in FIG. 2, coupled via a communication link with the interrogator device that initiates a pre-compensated time measurement and having a tag processor; a tag transceiver coupled to the tag processor; a tag timer coupled to the tag processor. As controlled by the tag processor, the tag transceiver transmits a first wireless signal and the tag timer of the tag device initiates the pre-compensated time measurement; the interrogator transceiver receives a second wireless signal from the tag device, provides it to the interrogator processor of the interrogator device, and the interrogator processor determines a first arrival time and a composite arrival time of the first wireless signal; as controlled by the interrogator timer the interrogator device waits a predetermined period of time less the difference in time between the first arrival time and the composite arrival time of the first wireless signal and the interrogator processor controls the interrogator transceiver of the interrogator device to transmit a second wireless signal; the tag transceiver of the tag device receives the second wireless device and the tag processor determines the composite arrival time of the second wireless signal, concluding the pre-compensated time measurement.

Figure 13:
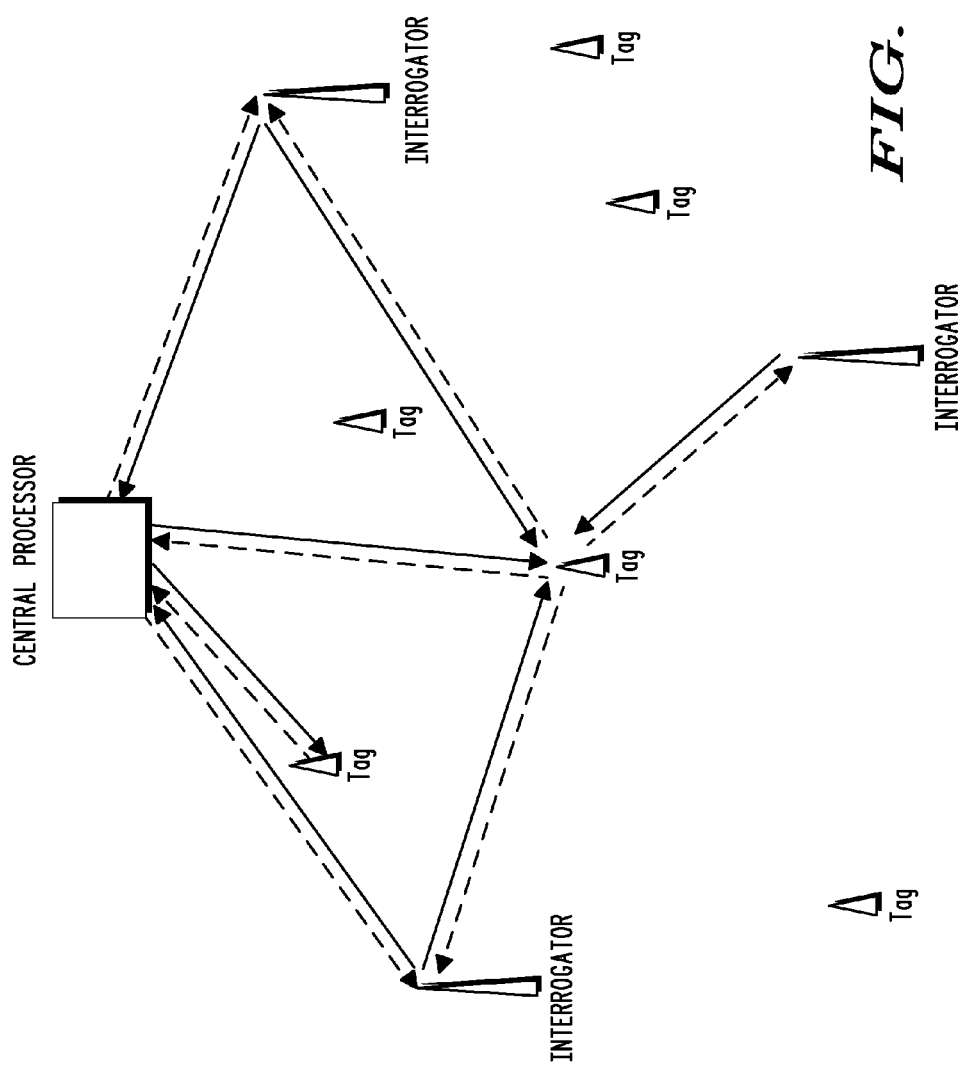
FIG. 13 is a block diagram of a wireless communication system having a central processor and a plurality of tag and interrogator devices, in accordance with various representative embodiments.

Alternatively, the interrogator can use a fixed TAT period and send the compensation value to the tag so that the tag device or a central system processor can correct its range calculation, in accordance with various representative embodiments. The asymmetric RTT ranging method, then, may be considered to comprise: transmitting a first wireless signal and initiating a time measurement; receiving the first wireless signal, determining arrival time information of the first wireless signal, and transmitting a second wireless signal after a predetermined period of time, wherein the second wireless signal includes the arrival time information of the first wireless signal; receiving the second wireless signal and arrival time information of the first wireless signal and determining the composite arrival time of the second wireless signal, concluding the time measurement; and compensating the result of the time measurement by the difference in time between the first arrival time and the composite arrival time of the first wireless signal. The arrival time information is composed at least in part of a first arrival time and a composite arrival time of the first wireless signal. In various embodiments, the compensation may be performed by the tag device or by a central processor of a wireless system, as shown in FIG. 13. The embodiment in which the tag device can correct its range calculation will be discussed first.

Figure 10:
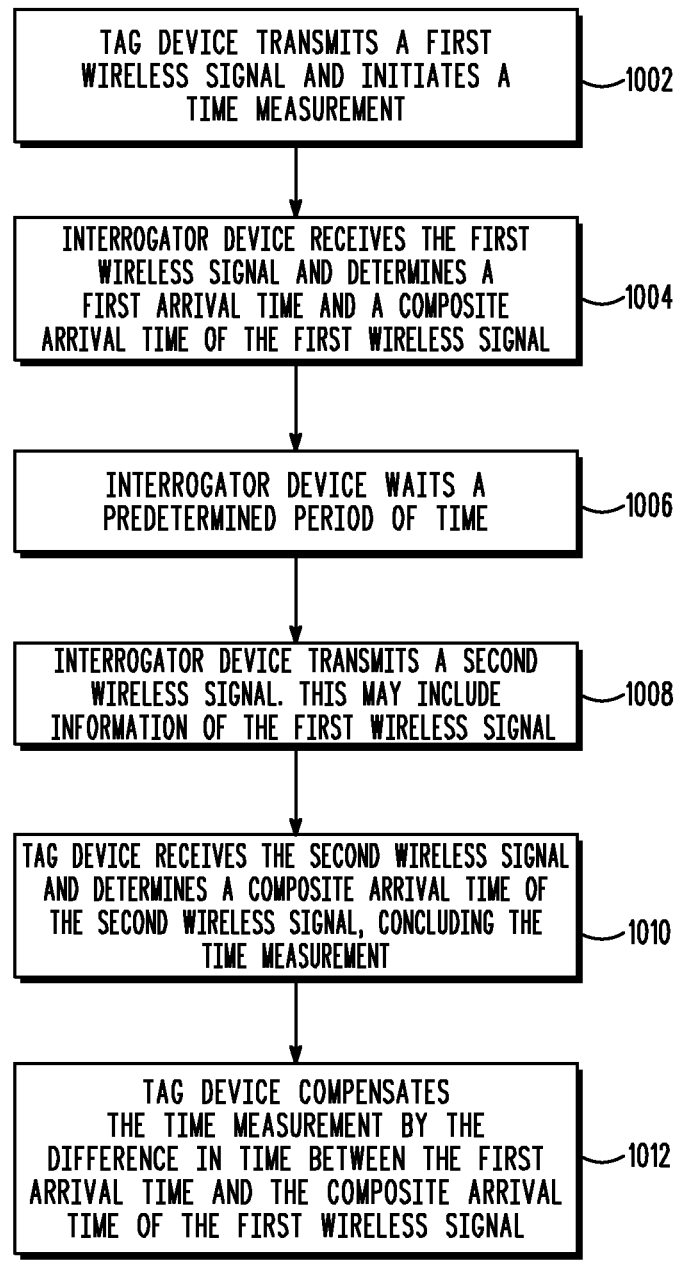

Referring now to flow 1000, the asymmetric RTT ranging method, of FIG. 10 starts with Block 1002 where a tag device transmits a first wireless signal and initiates a time measurement. At Blocks 1004-1008, an interrogator device receives the first wireless signal, determines a first arrival time and a composite arrival time of the first wireless signal, and then transmits a second wireless signal after a predetermined period of time; the second wireless signal may include the arrival time information of the first wireless signal. Alternately, the arrival time information of the first wireless signal could be sent separate from the second wireless signal at another time or be provided by another entity or device other than the interrogator device. Arrival time information of the first wireless signal could be its first arrival time and the composite arrival time, the difference between the two, or some other function of the arriving waveform. At Block 1010, the tag device receives the second wireless signal and determines the composite arrival time of the second wireless signal, concluding the time measurement. At Block 1012, the tag device compensates the result of the time measurement by the difference in time between the first arrival time and the composite arrival time of the first wireless signal. Again, the bandwidths of the first and second wireless signals differ by a factor of approximately four or more.

This methodology from the perspective of operation of the tag device comprises: a tag device transmitting a first wireless signal and initiating a time measurement; the tag device receiving a second wireless signal determining the composite arrival time of the second wireless signal; the tag receiving arrival time information of the first wireless signal, concluding the time measurement; and the tag device compensating the result of the time measurement at least in part by the difference in time between the first arrival time and the composite arrival time of the first wireless signal.

Referring back to the block diagram of FIG. 2, such a tag device has a processor or controller, a transceiver coupled to the processor, and a timer coupled to the processor. It may also have a modulator and a demodulator each coupled to the processor. As controlled by the processor, the transceiver transmits a first wireless signal and the timer initiates a time measurement; the transceiver receives a second wireless signal and arrival time information of the first wireless signal and provides the second wireless signal and the arrival time information to the processor; the processor determines a composite arrival time of the second wireless signal and controls the timer to conclude the time measurement by the timer; and the processor compensates the result of the time measurement by the difference in time between the arrival time information and the composite arrival time of the first wireless signal.

Making reference again to system block diagrams of FIGS. 3 and 4, it can be understood that wireless communication system embodiments that utilize the asymmetric ranging approach of FIG. 10 may comprise: one or more interrogator devices each having an interrogator processor, an interrogator transceiver coupled to the interrogator processor, and an interrogator timer coupled to the interrogator processor; and one or more tag devices coupled via one or more communication links to the one or more interrogator devices, each tag device having a tag processor and a tag transceiver coupled to the tag processor. The tag transceiver transmits the first wireless signal and the tag timer initiates the time measurement; the interrogator transceiver receives and provides the first wireless signal to the interrogator processor that determines the first arrival time and the composite arrival time of the first wireless signal, and the interrogator timer controls the interrogator transceiver to transmit the second wireless signal after a predetermined period of time; the tag transceiver receives the second wireless signal and arrival time information of the first wireless signal and the tag processor determines the composite arrival time of the second wireless signal, concluding the time measurement. As illustrated in FIG. 10, the tag processor can compensate the result of the time measurement by the difference in time between the first arrival time and the composite arrival time of the first wireless signal.

Moreover, in cases where the tag sends its range calculation back to the interrogator, either the interrogator can use a fixed TAT period, and either the interrogator or a central processor of a wireless system can compensate the range result received from the tag. Such an asymmetric RTT ranging method would comprise: a tag device transmitting a first wireless signal and initiating a time measurement; an interrogator device receiving the first wireless signal, determining a first arrival time and a composite arrival time of the first wireless signal, and transmitting a second wireless signal after a predetermined period of time; the tag device receiving the second wireless signal and determining the composite arrival time of the second wireless signal, concluding the time measurement; the tag device transmitting a third signal that contains the result of the time measurement; and receiving the third signal containing the result of the time measurement and compensating the result of the time measurement by the difference in time between the first arrival time and the composite arrival time of the first wireless signal.

Embodiments in which the interrogator can use a fixed TAT period and then compensate the range result received from the tag will first be described, in accordance with various other embodiments. This is shown and described further in connection with flow 1100 of FIG. 11 of the drawings. Referring now to Block 1102, the asymmetric RTT ranging method begins. A tag device transmits a first wireless signal and initiates a time measurement. At Blocks 1104-1108, an interrogator device receives the first wireless signal, determines a first arrival time and a composite arrival time of the first wireless signal, and transmits a second wireless signal after a predetermined period of time. At Block 1110, the tag device receives the second wireless signal and determines the composite arrival time of the second wireless signal, concluding the time measurement. The tag device transmits a third signal that contains the result of the time measurement at Block 1112. It is noted that the third signal transmitted by the tag device at Block 1112 need not necessarily be wireless. At Blocks 1114-1116, the interrogator device receives the third signal that contains the result of the time measurement and compensates the result of the time measurement by the difference in time between the first arrival time and the composite arrival time of the first wireless signal. The bandwidths of the first and second wireless signals differ by a factor of approximately four or more.

Figure 11:
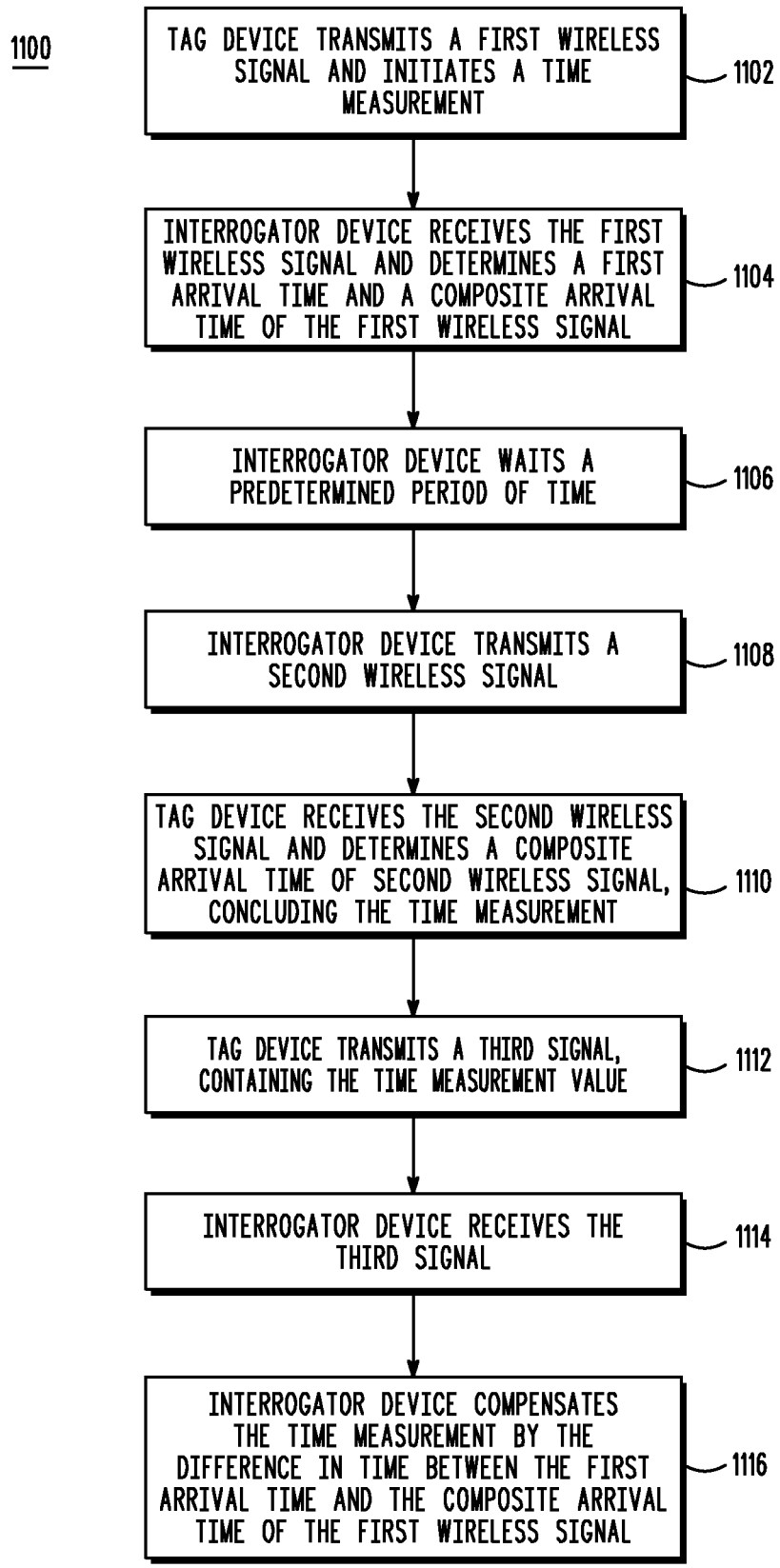

When considered from the perspective of a tag device, the asymmetric RTT ranging method of FIG. 11 may comprise: a tag device transmitting a first wireless signal and initiating a time measurement; the tag device receiving a second wireless signal and determining the composite arrival time of the second wireless signal, concluding the time measurement; and the tag device transmitting the result of the time measurement.

Referring again to FIG. 2, a tag device, having a processor, a transceiver coupled to the processor, and a timer coupled to the processor, may operate as follows. As controlled by the processor, the transceiver transmits a first wireless signal and the timer initiates a time measurement; the transceiver receives a second wireless signal and provides it to the processor; the processor determines a composite arrival time of the second wireless signal and controls the timer to conclude the time measurement by the timer; and the processor controls the transceiver to transmit the result of the time measurement.

Figure 12:
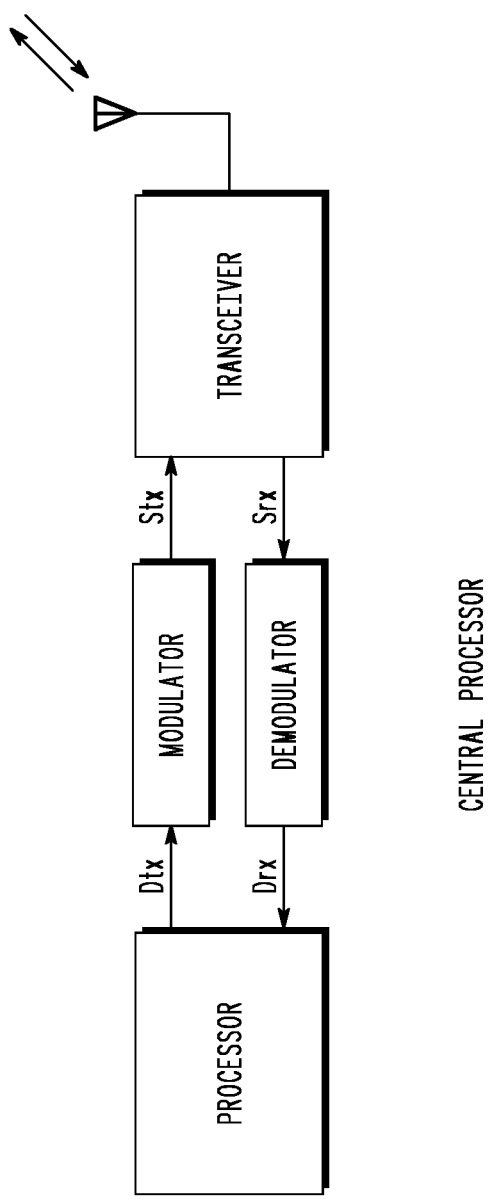
FIG. 12 is a block diagram of a system central processor, in accordance with various representative embodiments.

While it has been described that either an Interrogator device or a Tag device may undertake compensation of the time measurement in the asymmetric ranging methodologies, compensation may also be accomplished by a central processor of a wireless communications system. Referring now to FIG. 12, such a central processor may have a central processing processor element, a modulator, a demodulator, and a transceiver for sending and receiving information to interrogator and tag devices as shown in FIG. 13. A central processor provides data waveforms "Dtx" to the modulator and receives data waveforms "Drx" from the demodulator. A modulated signal "Stx" is converted to a wireless signal which is transmitted from the device, and a received wireless signal is converted to modulated signal "Srx" for further processing by the demodulator.

Figure 14:
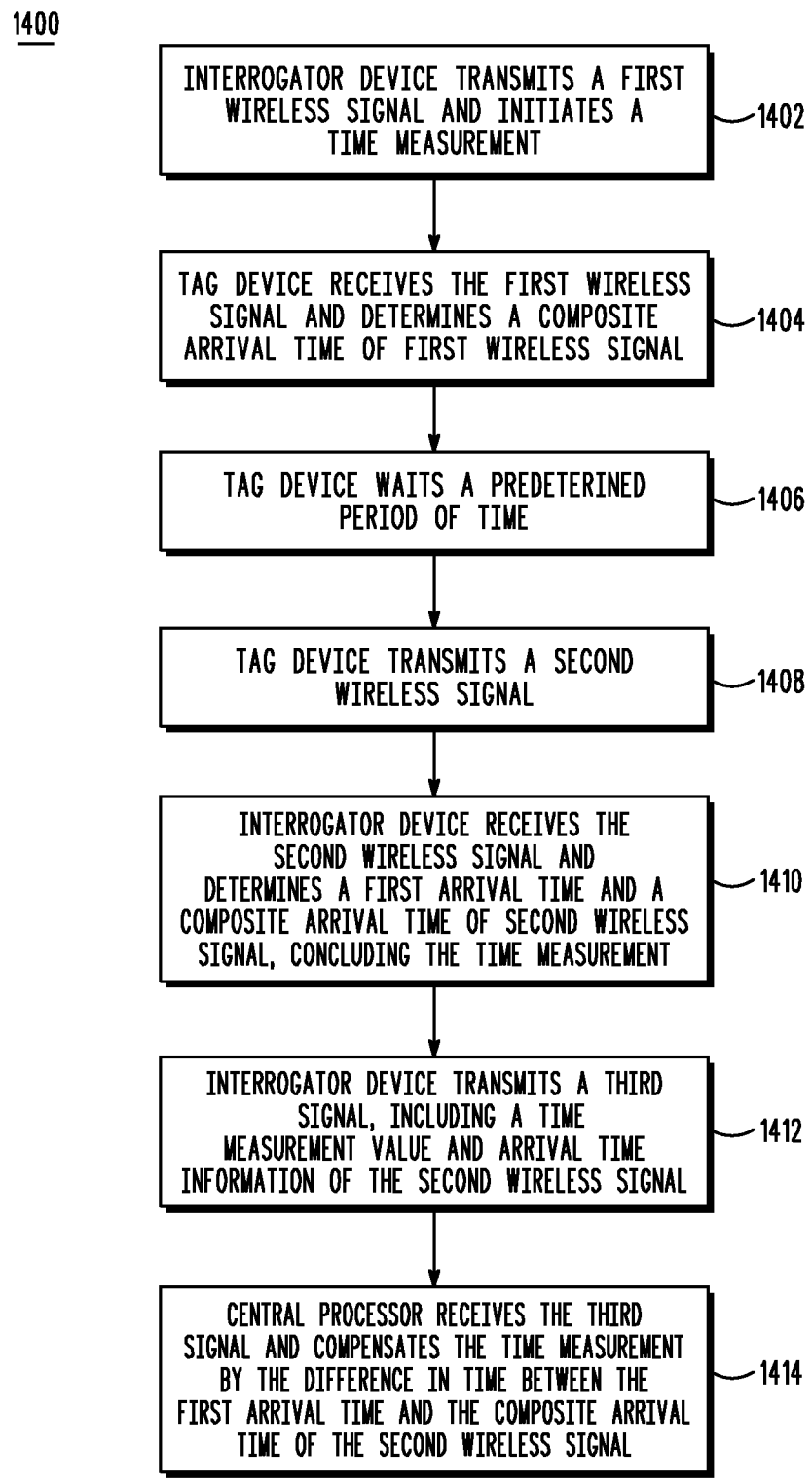
FIGS. 14-17 are flowcharts that illustrate various approaches to asymmetric RTT ranging, in accordance with various other representative embodiments.

Consider the flow 1400 of FIG. 14, a methodology of asymmetric RTT ranging in accordance with various embodiments in which the central processor of a wireless system can compensate a time measurement. At Block 1402, an interrogator device transmits a first wireless signal and initiates a time measurement. At Blocks 1404-1408, a tag device receives the first wireless signal and determines a composite arrival time of the first wireless signal and then transmits the second wireless signal after a predetermined period of time. At Block 1410, the interrogator device receives the second wireless signal and determines the first arrival time and the composite arrival time of the second wireless signal, concluding the time measurement. At Block 1412, the interrogator device transmits a third signal, which includes a time measurement value and arrival time information of the second wireless signal. At Block 1414, a central processor in communication with the interrogator device, such as shown in FIG. 13, receives the third signal and compensates the time measurement by the difference in time between the first arrival time and the composite arrival time of the second wireless signal. Again, the bandwidths of the first and second wireless signals differ by a factor of approximately four or more.

From a system perspective, a wireless communication system, such as that illustrated in FIG. 13, may have at least a tag device, at least one interrogator device, and a central processor. The central processor has at least a central processor processing element and a central processor transceiver coupled to the central processor processing element, as shown in FIG. 12. The interrogator device, which in this exemplary embodiment initiates a time measurement, is coupled to the central processor via first communication link and has an interrogator processor, an interrogator transceiver coupled to the interrogator processor, and an interrogator timer coupled to the interrogator processor, as illustrated in FIG. 2. The tag device is coupled via a second communication link to the interrogator device and has a tag processor, a tag transceiver coupled to the tag processor, and a tag timer coupled to the tag processor, also as illustrated in FIG. 2. Referring again to FIG. 14, as controlled by the interrogator processor, the interrogator transceiver transmits a first wireless signal and the interrogator timer of the interrogator device initiates the time measurement; the tag transceiver receives the first wireless signal and provides it to the tag processor that determines a composite arrival time of the first wireless signal; as controlled by the tag timer the tag waits a predetermined period of time and then the tag transceiver transmits a second wireless signal; the interrogator transceiver receives the second wireless signal and the interrogator processor determines a first arrival time and a composite arrival time of the second wireless signal, concluding the time measurement; the interrogator transceiver transmits a third signal that includes a time measurement value and arrival time information of the second wireless signal; and the central processor transceiver receives the third signal and the central processor processing element compensates the time measurement by the difference in time between the first arrival time and the composite arrival time of the second wireless signal.

Figure 15:
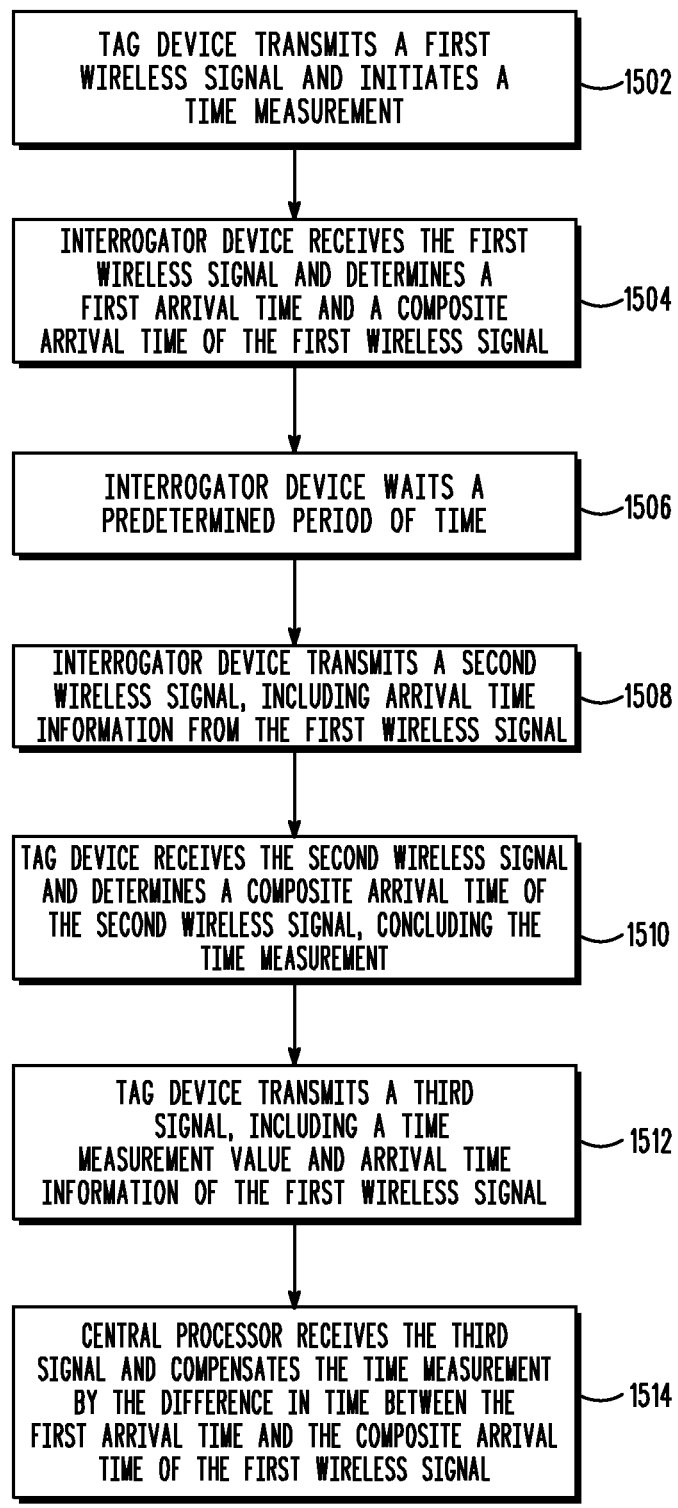

Referring now to flowchart 1500 of FIG. 15, another embodiment in which a system central processor undertakes the compensation portion of the asymmetrical ranging is illustrated. In this flow, the interrogator can use a fixed TAT period and send the compensation value to the tag, which in turn sends the compensation information to a central processor so that the central processor can correct the range calculation, in accordance with various representative embodiments. This flow, then, differs from that of FIG. 10 in that the central processor, not the tag device, performs the compensation. This asymmetric RTT ranging approach starts with Block 1502 where a tag device transmits a first wireless signal and initiates a time measurement. At Blocks 1504-1508, an interrogator device receives the first wireless signal, determines a first arrival time and a composite arrival time of the first wireless signal, and then transmits a second wireless signal after a predetermined period of time; the second wireless signal may include the first arrival time of the first wireless signal. Alternately, as previously discussed, the arrival time information of the first wireless signal could be sent separate from the second wireless signal at another time or be provided by another entity or device other than the interrogator device. Arrival time information of the first wireless signal could be its first arrival time and the composite arrival time, the difference between the two, or some other function of the arriving waveform. At Block 1510, the tag device receives the second wireless signal and determines the composite arrival time of the second wireless signal, concluding the time measurement. At Block 1512, the tag device transmits a third signal including a time measurement value and arrive time information of the second wireless signal. At Block 1514, a central processor to which the interrogator is coupled via a communication link receives the third signal and compensates the time measurement by the difference in time between the first arrival time and the composite arrival time of the second wireless signal. The bandwidths of the first and second wireless signals differ by a factor of approximately four or more.

The asymmetric RTT ranging method in this embodiment, then, may be considered to comprise: a tag device transmitting the first wireless signal and initiating the time measurement; an interrogator device receiving the first wireless signal, determining the first arrival time and the composite arrival time of the first wireless signal, and transmitting the second wireless signal after a predetermined period of time; the tag device receiving the second wireless signal and arrival time information of the first wireless signal and determining the composite arrival time of the second wireless signal, concluding the time measurement; the tag device transmitting a third signal that includes a time measurement value and arrival time information of the first wireless signal; and a central processor receiving the third signal and compensating the time measurement at least in part by the difference in time between the first arrival time and the composite arrival time of the first wireless signal.

Making reference again to system block diagrams of FIGS. 3, 4, and 13, it can be understood that wireless communication system embodiments that utilize the asymmetric ranging approach of FIG. 15 may comprise: a central processor having a central processor processing element and a central processor transceiver coupled to the central processor processing element; one or more interrogator devices coupled to the central processor each having an interrogator processor, an interrogator transceiver coupled to the interrogator processor, and an interrogator timer coupled to the interrogator processor; and one or more tag devices coupled to the one or more interrogator devices, each tag device having a tag processor and a tag transceiver coupled to the tag processor. The tag transceiver transmits the first wireless signal and the tag timer initiates the time measurement; the interrogator transceiver receives and provides the first wireless signal to the interrogator processor that determines the first arrival time and the composite arrival time of the first wireless signal, and the interrogator transceiver transmits the second wireless signal after a predetermined period of time; the tag transceiver receives the second wireless signal and arrival time information of the first wireless signal and the tag processor determines the composite arrival time of the second wireless signal, concluding the time measurement. As illustrated in FIG. 15, the central processor can compensate the result of the time measurement. Thus in such a system, the tag transceiver transmits a third signal that includes a time measurement value and arrival time information of the first wireless signal; and the central processor transceiver receives the third signal and the central processor processing element compensates the time measurement by the difference in time between the first arrival time and the composite arrival time of the first wireless signal.

Finally, in cases where the tag sends its range calculation back to the interrogator, as previously mentioned, either the interrogator or a central processor of a wireless system can compensate the range result received from the tag. Embodiments in which the central processor of the wireless system can compensate the range result received from the tag will now be described, in connection with FIGS. 16 and 17, in accordance with various embodiments. Referring to flowchart 1600 of FIG. 16, at Block 1602, a tag device transmits a first wireless signal and initiates a time measurement. At Blocks 1604-1608, an interrogator device receives the first wireless signal, determines a first arrival time and a composite arrival time of the first wireless signal, and transmits a second wireless signal after a predetermined period of time. At Block 1610, the tag device receives the second wireless signal and determines the composite arrival time of the second wireless signal, concluding the time measurement. The tag device transmits a third signal that contains the result of the time measurement at Block 1612. At Block 1614, the interrogator device receives the third signal that contains the result of the time measurement. At Block 1616, the interrogator device transmits a fourth signal that includes the time measurement value and arrival time information of the first wireless signal. At Block 1618, the fourth signal is received by a system central processor in communication with the interrogator device and the central processor compensates the time measurement by the difference in time between the first arrival time and the composite arrival time of the first wireless signal. The bandwidths of the first and second wireless signals differ by a factor of approximately four or more.

Figure 16:
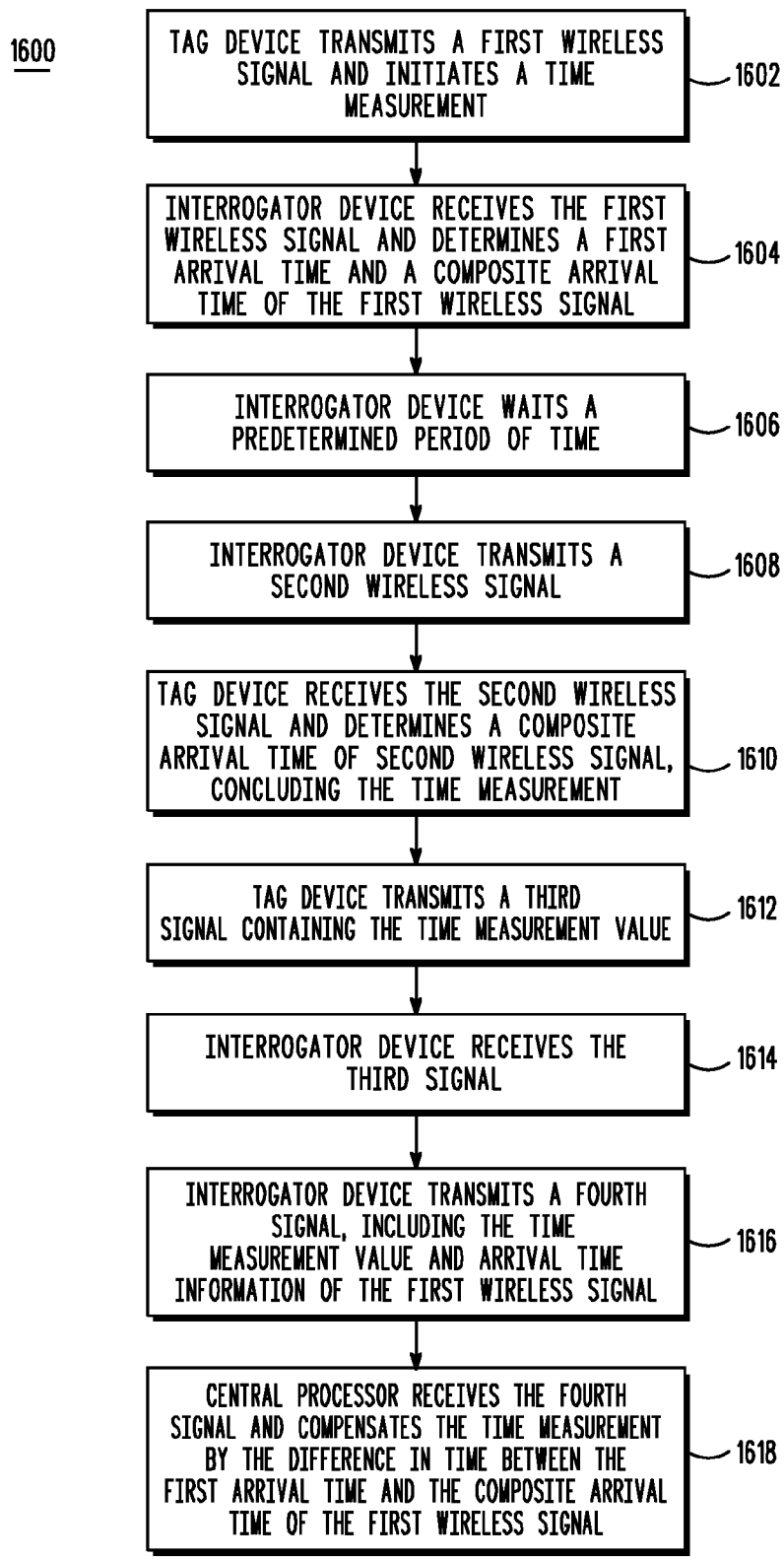

It can be understood that in accordance with the foregoing description of FIG. 16, an asymmetric RTT ranging method may comprise: a tag device transmitting a first wireless signal and initiating a time measurement; an interrogator device receiving the first wireless signal, determining a first arrival time and a composite arrival time of the first wireless signal, and transmitting a second wireless signal after a predetermined period of time; the tag device receiving the second wireless signal and determining the composite arrival time of the second wireless signal, concluding the time measurement; the tag device transmitting a third signal that contains the result of the time measurement; the interrogator device receiving the third signal and transmitting a fourth signal that includes the time measurement value and arrival time information of the first wireless signal; and a central processor receiving the fourth signal and compensating the time measurement by the difference in time between the first arrival time and the composite arrive time of the first wireless signal.

The third signal may alternatively be received directly by the central processor of the system from the tag device and a fourth signal including arrival time information received by the central processor from the interrogator device. Referring now to flowchart 1700 of FIG. 17, at Block 1702, a tag device transmits a first wireless signal and initiates a time measurement. At Blocks 1704-1708, an interrogator device receives the first wireless signal, determines a first arrival time and a composite arrival time of the first wireless signal, and transmits a second wireless signal after a predetermined period of time. At Block 1710, the tag device receives the second wireless signal and determines the composite arrival time of the second wireless signal, concluding the time measurement. The tag device transmits a third signal that contains the result of the time measurement at Block 1712. At Block 1714, a central processor of the wireless system, such as that illustrated in FIG. 13, receives the third signal transmitted by the tag device. At Block 1716, the interrogator device transmits a fourth signal including arrival time information from the first wireless signal. At Block 1718, the central processor receives the fourth signal transmitted by the interrogator device. At Block 1720, the central processor, having receiving the third and fourth signal, as defined, is able to compensate the time measurement by the difference in time between the first arrival time and the composite arrival time of the first wireless signal. The bandwidths of the first and second wireless signals differ by a factor of approximately four or more.

Figure 17:
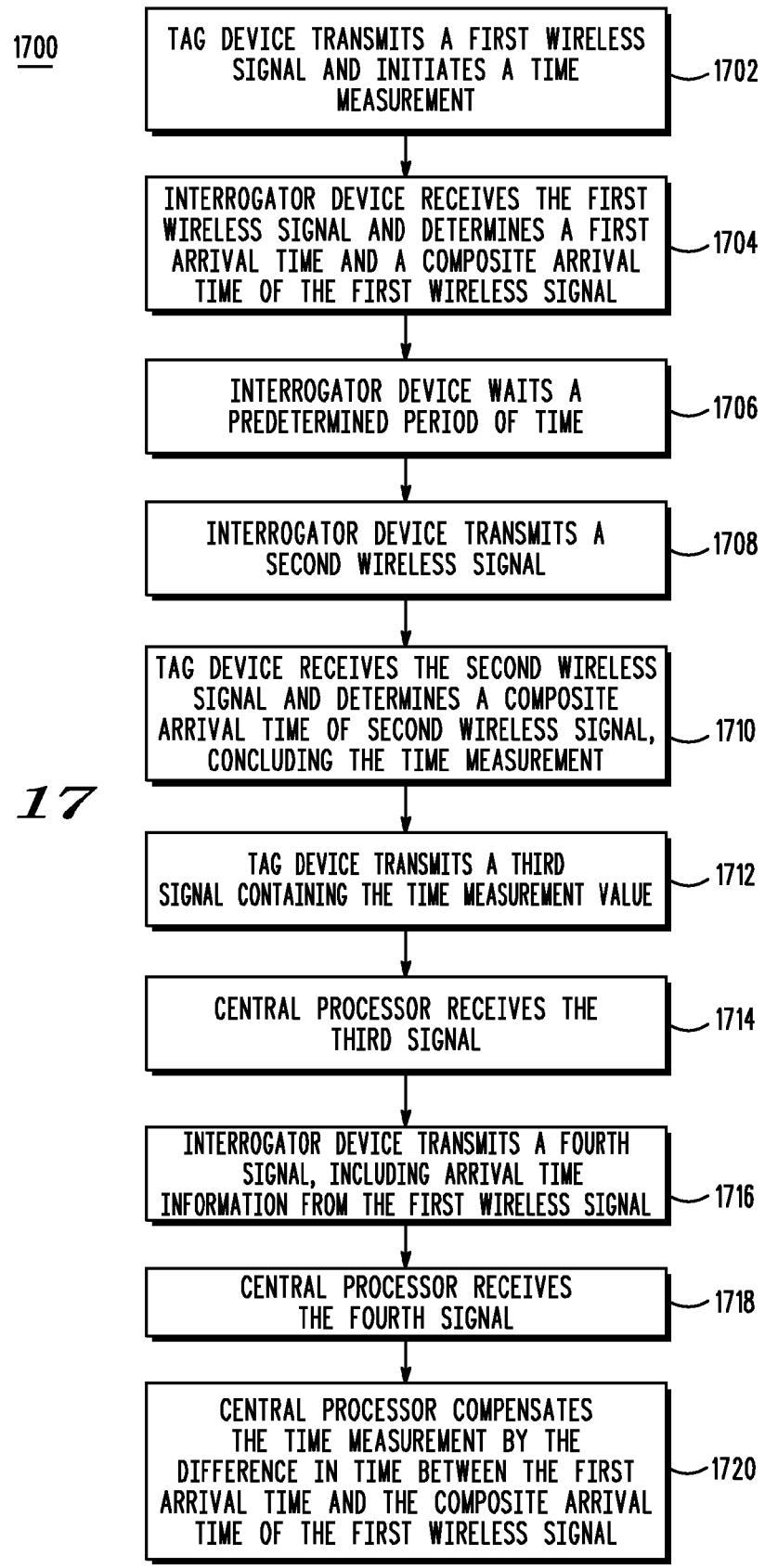

It can be understood that in accordance with the foregoing description of FIG. 17, an asymmetric RTT ranging method may comprise: a tag device transmitting a first wireless signal and initiating a time measurement; an interrogator device receiving the first wireless signal, determining a first arrival time and a composite arrival time of the first wireless signal, and transmitting a second wireless signal after a predetermined period of time; the tag device receiving the second wireless signal and determining the composite arrival time of the second wireless signal, concluding the time measurement; the tag device transmitting a third signal that contains the result of the time measurement; a central processor receiving the third signal; the interrogator device transmitting a fourth signal that includes the arrival time information of the first wireless signal; the central processor receiving the fourth signal; and the central processor compensating the time measurement by the difference in time between the first arrival time and the composite arrive time of the first wireless signal.

Making reference again to system block diagrams of FIGS. 3, 4, and 13, it can be understood that wireless communication system embodiments that utilize the asymmetric ranging approach of FIGS. 16 and 17 may have a central processor with a central processor processing element and a central processor transceiver coupled to the central processor processing element; one or more interrogator devices, each interrogator device having an interrogator processor, an interrogator transceiver coupled to the interrogator processor, and an interrogator timer coupled to the interrogator processor; and one or more tag devices coupled to one or more of the one or more interrogator devices, with each tag device having a tag processor and a tag transceiver coupled to the tag processor. The tag transceiver transmits a first wireless signal and initiates a time measurement; the interrogator transceiver receives and provides the first wireless signal to the interrogator processor that determines a first arrival time and a composite arrival time of the first wireless signal and controls the interrogator transceiver to transmit a second wireless signal after a predetermined period of time; the tag transceiver receives and provides the second wireless signal to the tag processor that determines the composite arrival time of the second wireless signal and controls the timer to conclude the time measurement; and the tag transceiver transmits a third signal that contains the result of the time measurement.

Moreover, in the embodiment illustrated in FIG. 16, the central processor receives information from the interrogator devices in order to do the compensation. Thus, the interrogator transceiver receives the third signal and transmits a fourth signal that includes the time measurement value and arrival time information of the first wireless signal. The central processor transceiver receives the fourth signal and the central processor processing element compensates the time measurement by the difference in time between the first arrival time and the composite arrive time of the first wireless signal.

In the embodiment illustrated in FIG. 17, the central processor receives information from the tag device and then does compensation. In this case, the central processor transceiver receives the third signal; the interrogator transceiver transmits a fourth signal that includes arrival time information of the first wireless signal; the central processor transceiver receives the fourth signal; and the central processor processing element compensates the time measurement by the difference in time between the first arrival time and the composite arrive time of the first wireless signal.

As used herein, the terms "third signal" and "fourth signal" may refer to signals that may or may not be wireless signals, and both types of signals are contemplated within the various embodiments discussed above. While tag devices may for the most part transmit wireless signals, for example, interrogator devices may transmit both wireless and non-wireless signals. Consider interrogator devices in a cellular or other wireless communication system. In such systems, the interrogator device may transmit wireless signals but may also behave as a base- or way-station to transmit non-wireless signals in the system, such as to a central processor via an Internet connection, which may or may not be wireless.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An asymmetric RTT ranging method for location determination between an interrogator device and a tag device, comprising:
   the interrogator device transmitting a first wireless signal and initiating a time measurement;
   the tag device receiving the first wireless signal and determining a composite arrival time of the first wireless signal and transmitting a second wireless signal after a predetermined period of time;
   the interrogator device receiving the second wireless signal and determining a first arrival time and a composite arrival time of the second wireless signal, concluding the time measurement; and
   compensating the time measurement at least in part by the difference in time between the first arrival time and the composite arrival time of the second wireless signal wherein the compensated time measurement is useful to determine ranging between the interrogator device and the tag device,
   wherein a bandwidth of the first wireless signal transmitted by the interrogator device and a bandwidth of the second wireless signal transmitted by the tag device differ by a factor of approximately four or more with the bandwidth of the second wireless signal approximately four or more times the bandwidth of the first wireless signal.

2. The method of claim 1, wherein compensating the time measurement at least in part by the difference in time between the first arrival time and the composite arrival time of the second wireless signal is performed by the interrogator device.

3. The method of claim 1, wherein compensating the time measurement at least in part by the difference in time between the first arrival time and the composite arrival time of the second wireless signal further comprises:
   the interrogator device transmitting a third signal that includes a time measurement value and arrival time information of the second wireless signal; and
   a central processor receiving the third signal and compensating the time measurement at least in part by the difference in time between the first arrival time and the composite arrival time of the second wireless signal.

4. An interrogator device, comprising:
   a processor;
   a transceiver coupled to the processor;
   a timer coupled to the processor;
   wherein as controlled by the processor, the transceiver transmits a first wireless signal and the timer initiates a time measurement; the transceiver receives a second wireless signal from a tag device and provides it to the processor; the processor determines a first arrival time and a composite arrival time of the second wireless signal and controls the timer to conclude the time measurement by the timer; and the processor compensates the time measurement at least in part by the difference in time between the determined first arrival time and the determined composite arrival time of the second wireless signal where the compensated time measurement is useful to determine ranging between the interrogator device and the tag device, and
   wherein a bandwidth of the first wireless signal transmitted by the interrogator device and a bandwidth of the second wireless signal received from the tag device differ by a factor of approximately four or more with the bandwidth of the second wireless signal approximately four or more times the bandwidth of the first wireless signal.

5. A wireless communication system, comprising:
   a central processor, the central processor comprising:
   a central processor processing element;
   a central processor transceiver coupled to the central processor processing element;

an interrogator device that initiates a time measurement and is coupled to the central processor via a first communication link, the interrogator device comprising:
an interrogator processor;
an interrogator transceiver coupled to the interrogator processor;
an interrogator timer coupled to the interrogator processor;
a tag device coupled via a second communication link with the interrogator device, the tag device comprising:
a tag processor;
a tag transceiver coupled to the tag processor;
a tag timer coupled to the tag processor;
wherein the interrogator transceiver transmits a first wireless signal and the interrogator timer of the interrogator device initiates the time measurement; the tag transceiver receives the first wireless signal and provides it to the tag processor that determines a composite arrival time of the first wireless signal; as controlled by the tag timer the tag device waits a predetermined period of time and then the tag transceiver transmits a second wireless signal; the interrogator transceiver receives the second wireless signal and the interrogator processor determines a first arrival time and a composite arrival time of the second wireless signal, concluding the time measurement; the interrogator transceiver transmits a third signal that includes a time measurement value and arrival time information of the second wireless signal; and the central processor transceiver receives the third signal and the central processor processing element compensates the time measurement at least in part by the difference in time between the first arrival time and the composite arrival time of the second wireless signal, wherein the compensated time measurement is useful to determine ranging between the interrogator device and the tag device, and
wherein a bandwidth of the first wireless signal transmitted by the interrogator transceiver and a bandwidth of the second wireless signal transmitted by the tag transceiver differ by a factor of approximately four or more with the bandwidth of the second wireless signal approximately four or more times the bandwidth of the first wireless signal.

6. An asymmetric RTT ranging method for location determination between a tag device and an interrogator device, comprising:
the tag device transmitting a first wireless signal and initiating a pre-compensated time measurement;
the interrogator device receiving the first wireless signal and determining a first arrival time and a composite arrival time of the first wireless signal;
the interrogator device waiting a predetermined period of time less the difference in time between the first arrival time and the composite arrival time of the first wireless signal;
the interrogator device transmitting a second wireless signal; and
the tag device receiving the second wireless signal and determining the composite arrival time of the second wireless signal, concluding the pre-compensated time measurement wherein the pre-compensated time measurement is useful to determine ranging between the tag device and the interrogator device,
wherein a bandwidth of the first wireless signal transmitted by the tag device and a bandwidth of the second wireless signal transmitted by the interrogator device differ by a factor of approximately four or more with the bandwidth of the first wireless signal approximately four or more times the bandwidth of the second wireless signal.

7. A wireless system, comprising:
an interrogator device comprising:
an interrogator processor;
an interrogator transceiver coupled to the interrogator processor;
an interrogator timer coupled to the an interrogator processor;
a tag device coupled via a communication link to the interrogator device that initiates a pre-compensated time measurement, the tag device comprising:
a tag processor;
a tag transceiver coupled to the tag processor;
a tag timer coupled to the tag processor;
wherein the tag transceiver transmits a first wireless signal and the tag timer of the tag device initiates the pre-compensated time measurement; the interrogator transceiver receives the first wireless signal from the tag device, provides it to the interrogator processor of the interrogator device, and the interrogator processor determines a first arrival time and a composite arrival time of the first wireless signal; as controlled by the interrogator timer the interrogator device waits a predetermined period of time less the difference in time between the first arrival time and the composite arrival time of the first wireless signal and the interrogator processor controls the interrogator transceiver of the interrogator device to transmit a second wireless signal; the tag transceiver of the tag device receives the second wireless device and the tag processor determines the composite arrival time of the second wireless signal, concluding the pre-compensated time measurement, wherein the pre-compensated time measurement is useful to determine ranging between the interrogator device and the tag device, and
wherein a bandwidth of the first wireless signal transmitted by the tag transceiver and a bandwidth of the second wireless signal transmitted by the interrogator transceiver differ by a factor of approximately four or more with the bandwidth of the first wireless signal approximately four or more times the bandwidth of the second wireless signal.

8. An asymmetric RTT ranging method for location determination between an interrogator device and a tag device, comprising:
the tag device transmitting a first wireless signal and initiating a time measurement;
the interrogator device receiving the first wireless signal, determining arrival time information of the first wireless signal, and transmitting a second wireless signal after a predetermined period of time;
the tag device receiving the second wireless signal and the arrival time information of the first wireless signal and determining the composite arrival time of the second wireless signal, concluding the time measurement; and
compensating the result of the time measurement at least in part by the difference in time between the first arrival time and the composite arrival time of the first wireless signal wherein the compensated time measurement is useful to determine ranging between the interrogator device and the tag device,
wherein a bandwidth of the first wireless signal transmitted by the tag device and a bandwidth of the second wireless signal transmitted by the interrogator device differ by a factor of approximately four or more with the bandwidth of the first wireless signal approximately four or more times the bandwidth of the second wireless signal.

9. The method of claim 8, wherein the arrival time information is comprised at least in part of a first arrival time and a composite arrival time of the first wireless signal.

10. The method of claim 8, wherein the second wireless signal includes the arrival time information of the first wireless signal.

11. The method of claim 8, comprising:
the tag device transmitting the first wireless signal and initiating the time measurement;
the interrogator device receiving the first wireless signal, determining the first arrival time and the composite arrival time of the first wireless signal, and transmitting the second wireless signal after a predetermined period of time;
the tag device receiving the second wireless signal and arrival time information of the first wireless signal and determining the composite arrival time of the second wireless signal, concluding the time measurement; and
compensating the result of the time measurement at least in part by the difference in time between the first arrival time and the composite arrival time of the first wireless signal.

12. The method of claim 11, further comprising:
the tag device compensating the result of the time measurement at least in part by the difference in time between the first arrival time and the composite arrival time of the first wireless signal.

13. The method of claim 11, wherein compensating the result of the time measurement at least in part by the difference in time between the first arrival time and the composite arrival time of the first wireless signal further comprises:
the tag device transmitting a third signal that includes a time measurement value and arrival time information of the first wireless signal; and
a central processor receiving the third signal and compensating the time measurement at least in part by the difference in time between the first arrival time and the composite arrival time of the first wireless signal.

14. The method of claim 8, further comprising:
the tag device receiving the second wireless signal and determining the composite arrival time of the second wireless signal;
after receiving the second wireless signal, the tag device receiving arrival time information of the first wireless signal, concluding the time measurement; and
the tag device compensating the result of the time measurement at least in part by the difference in time between the first arrival time and the composite arrival time of the first wireless signal wherein the compensated time measurement is useful to determine ranging between the interrogator device and the tag device.

15. A tag device, comprising:
a processor;
a transceiver coupled to the processor;
a timer coupled to the processor;
wherein as controlled by the processor, the transceiver transmits a first wireless signal and the timer initiates a time measurement; the transceiver receives from an interrogator device a second wireless signal and arrival time information of the first wireless signal and provides the second wireless signal and the arrival time information to the processor; the processor determines a composite arrival time of the second wireless signal and controls the timer to conclude the time measurement by the timer wherein the time measurement is useful to determine ranging between the tag device and the interrogator device, and
wherein a bandwidth of the first wireless signal transmitted by the transceiver and a bandwidth of the second wireless signal received by the transceiver from the interrogator device differ by a factor of approximately four or more with the bandwidth of the first wireless signal approximately four or more times the bandwidth of the second wireless signal.

16. The tag device of claim 15, wherein the processor compensates the result of the time measurement at least in part by the difference in time between the first arrival time and the composite arrival time of the first wireless signal.

17. The tag device of claim 15, wherein the transceiver is controlled by the processor to transmit a third signal including a time measurement value and arrival time information of the second wireless signal.

18. A wireless communication system, comprising:
one or more interrogator devices, each interrogator device comprising:
an interrogator processor;
an interrogator transceiver coupled to the interrogator processor;
an interrogator timer coupled to the interrogator processor;
one or more tag devices coupled to one or more of the one or more interrogator devices via one or more communication links, each tag device comprising:
a tag processor;
a tag transceiver coupled to the tag processor;
a tag timer coupled to the tag processor;
wherein the tag transceiver transmits the first wireless signal and the tag timer initiates the time measurement; the interrogator transceiver receives and provides the first wireless signal to the interrogator processor that determines the first arrival time and the composite arrival time of the first wireless signal, and the interrogator transceiver transmits the second wireless signal after a predetermined period of time; the tag transceiver receives the second wireless signal and arrival time information of the first wireless signal and the tag processor determines the composite arrival time of the second wireless signal, concluding the time measurement, wherein the time measurement is useful to determine ranging between the interrogator device and the tag device and
wherein a bandwidth of the first wireless signal transmitted by the tag transceiver and a bandwidth of the second wireless signal transmitted by the interrogator transceiver differ by a factor of approximately four or more with the bandwidth of the first wireless signal approximately four or more times the bandwidth of the second wireless signal.

19. The system of claim 18, wherein the tag processor compensates the result of the time measurement at least in part by the difference in time between the first arrival time and the composite arrival time of the first wireless signal, wherein the compensated time measurement is useful to determine ranging between the interrogator device and the tag device.

20. The system of claim 18, the system further comprising a central processor having:
a central processor processing element; and
a central processor transceiver coupled to the central processor processing element,
wherein the tag transceiver transmits a third signal that includes a time measurement value and arrival time information of the first wireless signal; and the central processor transceiver receives the third signal and the central processor processing element compensates the time measurement at least in part by the difference in time between the first arrival time and the composite arrival time of the first wireless signal wherein the compensated time measurement is useful to determine ranging between the interrogator device and the tag device.

21. An asymmetric RTT ranging method for location determination between an interrogator device and a tag device, comprising:

the tag device transmitting a first wireless signal and initiating a time measurement;

the interrogator device receiving the first wireless signal, determining a first arrival time and a composite arrival time of the first wireless signal, and transmitting a second wireless signal after a predetermined period of time;

the tag device receiving the second wireless signal and determining the composite arrival time of the second wireless signal, concluding the time measurement;

the tag device transmitting a third signal that contains the result of the time measurement; and receiving the third signal and compensating the result of the time measurement at least in part by the difference in time between the first arrival time and the composite arrival time of the first wireless signal wherein the compensated time measurement is useful to determine ranging between the interrogator device and the tag device, wherein a bandwidth of the first wireless signal transmitted by the tag device and a bandwidth of the second wireless signal transmitted by the interrogator device differ by a factor of approximately four or more with the bandwidth of the first wireless signal approximately four or more times the bandwidth of the second wireless signal.

22. The method of claim 21, wherein receiving the third signal and compensating the result of the time measurement at least in part by the difference in time between the first arrival time and the composite arrival time of the first wireless signal further comprises:

the interrogator device receiving the third signal and compensating the result of the time measurement at least in part by the difference in time between the first arrival time and the composite arrival time of the first wireless signal.

23. The method of claim 21, wherein receiving the third signal and compensating the result of the time measurement at least in part by the difference in time between the first arrival time and the composite arrival time of the first wireless signal further comprises:

the interrogator device receiving the third signal and transmitting a fourth signal that includes the time measurement value and arrival time information of the first wireless signal; and a central processor receiving the fourth signal and compensating the time measurement at least in part by the difference in time between the first arrival time and the composite arrive time of the first wireless signal.

24. The method of claim 21, wherein receiving the third signal and compensating the result of the time measurement at least in part by the difference in time between the first arrival time and the composite arrival time of the first wireless signal further comprises:

a central processor receiving the third signal;

the interrogator device transmitting a fourth signal that includes arrival time information of the first wireless signal;

the central processor receiving the fourth signal; and the central processor compensating the time measurement at least in part by the difference in time between the first arrival time and the composite arrive time of the first wireless signal.

25. A tag device, comprising:

a processor;

a transceiver coupled to the processor;

a timer coupled to the processor;

wherein as controlled by the processor, the transceiver transmits a first wireless signal and the timer initiates a time measurement; the transceiver receives from an interrogator device a second wireless signal and provides it to the processor; the processor determines a composite arrival time of the second wireless signal and controls the timer to conclude the time measurement by the timer; and the processor controls the transceiver to transmit a third signal that contains the result of the time measurement wherein the time measurement is useful to determine ranging between the tag device and the interrogator device, and wherein a bandwidth of the first wireless signal transmitted by the transceiver and a bandwidth of the second wireless signal received by the transceiver from the interrogator device differ by a factor of approximately four or more with the bandwidth of the first wireless signal approximately four or more times the bandwidth of the second wireless signal.

26. A wireless communication system, comprising:

one or more interrogator devices, each interrogator device comprising:

an interrogator processor;

an interrogator transceiver coupled to the interrogator processor; and an interrogator timer coupled to the interrogator processor;

one or more tag devices coupled to one or more of the one or more interrogator devices, each tag device comprising:

a tag processor;

a tag transceiver coupled to the tag processor; and a tag timer coupled to the tag processor;

wherein the tag transceiver transmits a first wireless signal and the tag timer initiates a time measurement; the interrogator transceiver receives and provides the first wireless signal to the interrogator processor that determines a first arrival time and a composite arrival time of the first wireless signal and the interrogator timer controls the interrogator transceiver to transmit a second wireless signal after a predetermined period of time; the tag transceiver receives and provides the second wireless signal to the tag processor that determines the composite arrival time of the second wireless signal; the tag timer concludes the time measurement; and the tag transceiver transmits a third signal that contains the result of the time measurement, wherein the time measurement is useful to determine ranging between the interrogator device and the tag device, wherein a bandwidth of the first wireless signal transmitted by the tag transceiver and a bandwidth of the second wireless signal transmitted by the interrogator transceiver differ by a factor of approximately four or more with the bandwidth of the first wireless signal approximately four or more times the bandwidth of the second wireless signal.

27. The system of claim 26, wherein the interrogator transceiver receives and provides the third signal to the interrogator processor that compensates the result of the time measurement at least in part by the difference in time between the first arrival time and the composite arrival time of the first wireless signal, wherein the compensated time measurement is useful to determine ranging between the interrogator device and the tag device.

28. The system of claim 26, the system further comprising a central processor having:
   a central processor processing element; and
   a central processor transceiver coupled to the central processor processing element,
   wherein the interrogator transceiver receives the third signal and transmits a fourth signal that includes the time measurement value and arrival time information of the first wireless signal; and the central processor transceiver receives the fourth signal and the central processor processing element compensates the time measurement at least in part by the difference in time between the first arrival time and the composite arrive time of the first wireless signal, wherein the compensated time measurement is useful to determine ranging between the interrogator device and the tag device.

29. The system of claim 26, the system further comprising a central processor having:
   a central processor processing element; and
   a central processor transceiver coupled to the central processor processing element,
   wherein the central processor transceiver receives the third signal; the interrogator transceiver transmits a fourth signal that includes arrival time information of the first wireless signal; the central processor transceiver receives the fourth signal; and the central processor processing element compensates the time measurement at least in part by the difference in time between the first arrival time and the composite arrive time of the first wireless signal, wherein the compensated time measurement is useful to determine ranging between the interrogator device and the tag device.

* * * * *